Figure 1:
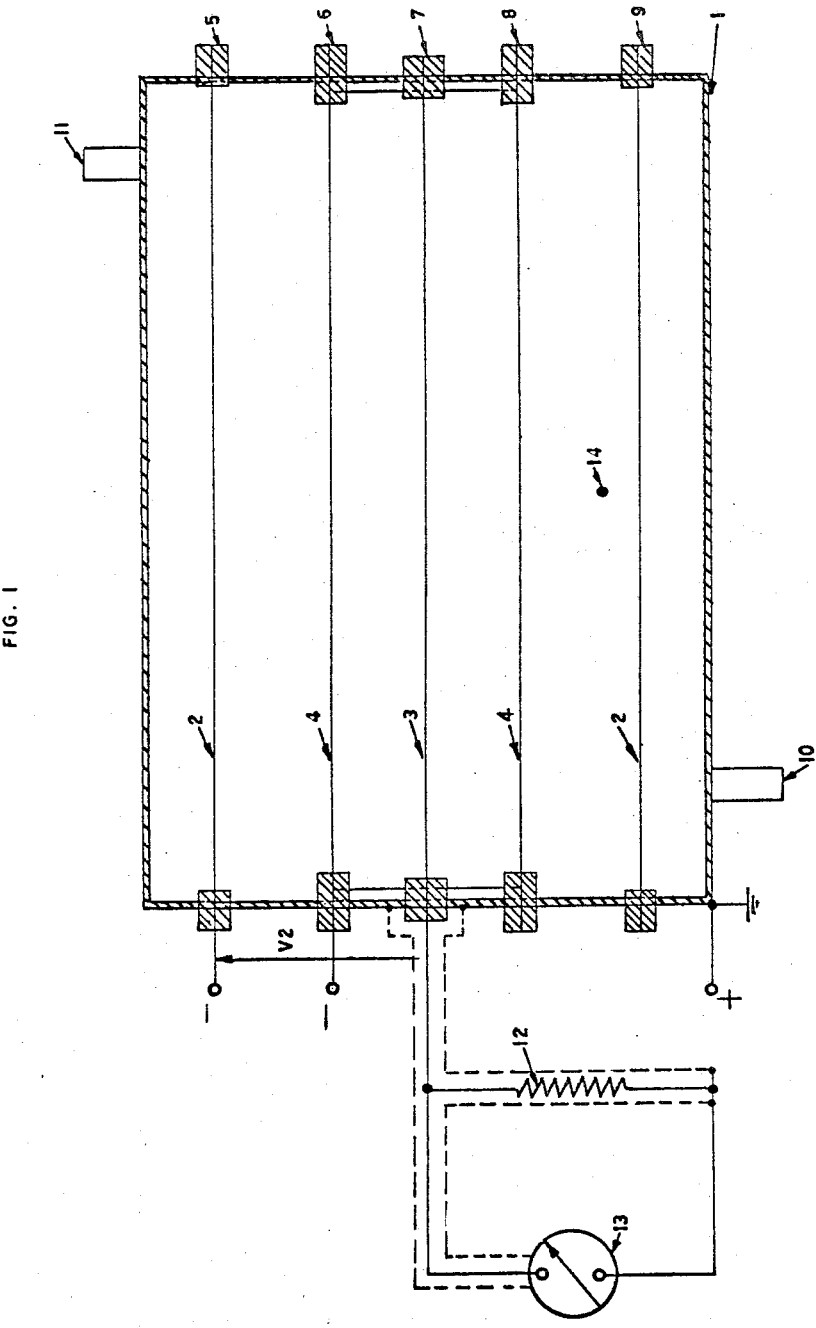

March 12, 1968   F. W. FALK   3,373,282
IONIZING RADIATION DOSE RATE MEASURING DEVICES INCLUDING
UTILIZATION AS GAS DENSITY METERS
Filed Feb. 13, 1964   2 Sheets-Sheet 1

INVENTOR
Fred W. Falk
BY Jacobi & Davidson
ATTORNEYS

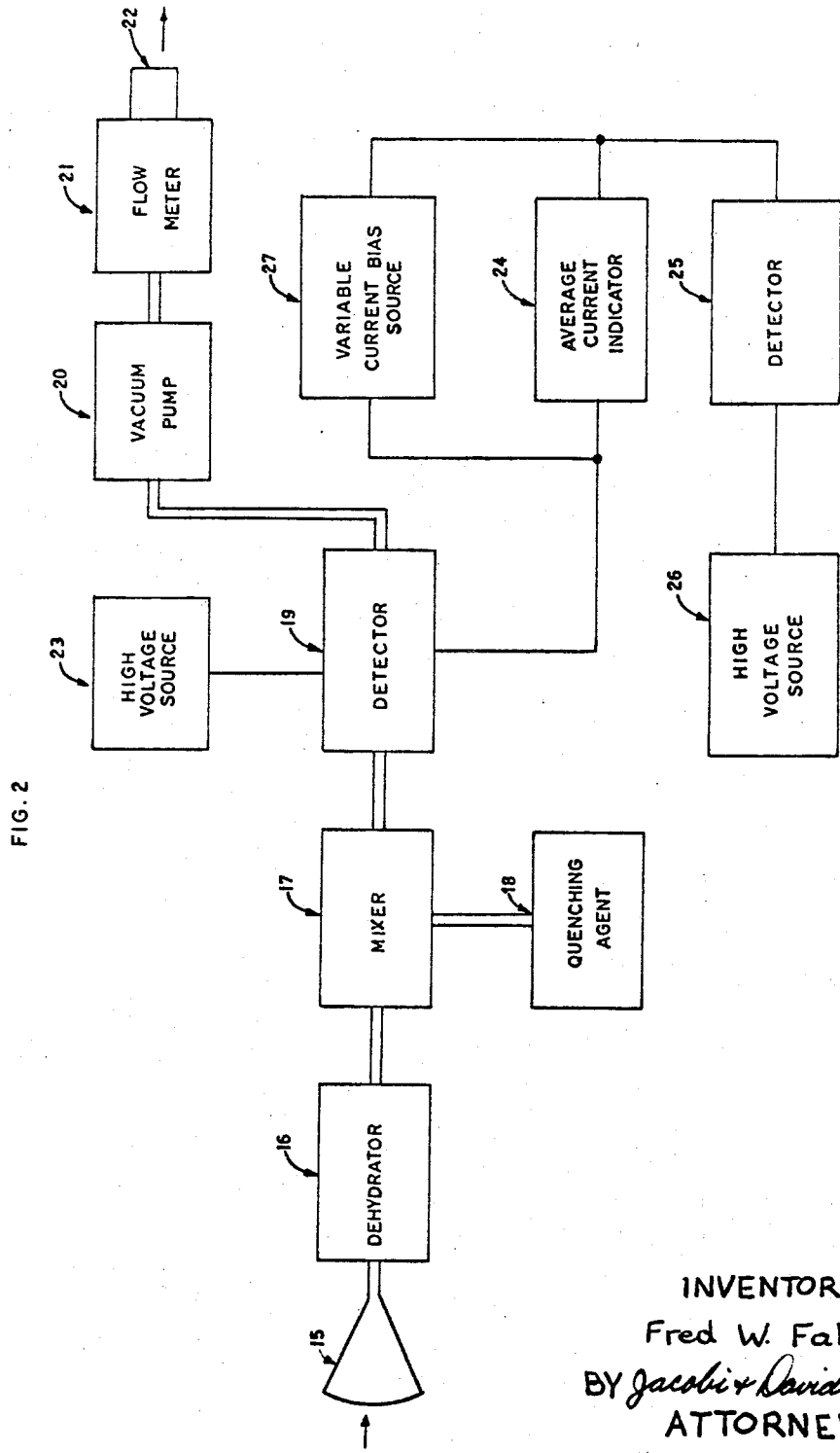

United States Patent Office 3,373,282
Patented Mar. 12, 1968

3,373,282
IONIZING RADIATION DOSE RATE MEASURING DEVICES INCLUDING UTILIZATION AS GAS DENSITY METERS
Fred W. Falk, Pirmasens, Germany, assignor to the United States of America as represented by the Secretary of the Army
Filed Feb. 13, 1964, Ser. No. 344,614
7 Claims. (Cl. 250—83.6)

Conventional systems for measurement of dose rate or exposure rate at low levels involve the use of Geiger-Müller tubes or ionization chambers. Geiger-Müller tubes provide a large output pulse, but the pulse amplitude is not proportional to the primary ionization. Therefore, measuring devices using Geiger-Müller tubes can only be calibrated to read accurately over a small energy range. Although this problem is not present with ionization chambers, their output is so small that costly and inconvenient methods, such as very high filling gas pressures, large chamber volume, as well as electrometers of extremely high input resistance and sensitivity must be used.

It is, therefore, an object of the present invention to provide an improved radiation detecting element having high output which is still proportional to the ionizing radiation thus allowing direct measurement of exposure rate.

It is an additional object of this invention to provide an improved ionizing radiation measuring device for the measurement of exposure rate from radiation originating outside of the detector.

It is still another object of the present invention to provide an improved density meter for gases utilizing a relatively constant external source of radiation and the variation on a meter as a function of the detector filling gas density.

It is still a further object of the present invention to provide an improved ionizing radiation measuring device for the measurement of exposure rate from radiation originating inside the detector.

By way of illustration, FIGURE 1 shows a cutaway view with various components of the improved detector shown schematically.

FIGURE 2 shows an improved system for monitoring the exposure rate of air or any other gas.

Returning now to FIGURE 1, the entire detector is enclosed in a case 1 which may be of metal and in turn grounded for electrical shielding and protection of personnel. However, to improve energy response it may also be of material having nearly air equivalent density and be covered with a grounded screen. Mounted inside case 1 which may have any practical shape but which for illustration may be assumed to be either rectangular or a cylinder is a cathode 2 and an anode 3. The cathode 2 may be of sheet metal, metal screen, plated surface on insulating material or any other suitable means of obtaining a conducting medium. The cathode 2 is so placed that the perpendicular distance between it and the anode 3 is equal over the entire surface of cathode 2. Anode 3 is simply a fine wire for cylindrical construction or a grid made up for fine wires for rectangular construction. Mounted between the cathode 2 and anode 3, but relatively close to anode 3 is grid 4 for which the perpendicular distance between it and anode 3 is equal over the entire surface of grid 4. Grid 4 is made up of fine wires or perforated sheet metal.

The internal components of the detector are supported at both ends of case 1 by corresponding insulators 5, 6, 7, 8 and 9 with provision, as indicated, to bring connections out of case 1 for cathode 2, anode 3 and grid 4. With polarities connected, as shown ion pairs formed by ionizing radiation passing through the filling gas of the detector will tend to operate with the electrons drifting to the anode 3 and the positive ions drifting to the cathode 2. The filling gas can either be sealed or held inside case 1 at constant pressure or the detector may be operated in constant flow made by utilizing inlet 10 and outlet 11 with gas at controllable pressure and a suitable rate of flow indicator.

Ignoring for the moment the action of grid 4, the electric field strength about anode 3 is given by the following formula for a detector with cylindrical geometry:

$$E(d) = \frac{V_2}{d \ln \frac{b}{a}}$$

where:

$d$ is the distance from anode 3 at which the field strength $E(d)$ is being evaluated
$V_2$ is the absolute value of the voltage applied between cathode 2 and anode 3
$b$ is the radius of cathode 2
$a$ is the radius of anode 3

The field strength close to anode 3 increases rapidly and if $V_2$ is sufficiently large and "$a$" sufficiently small, the electrons drifting toward the anode 3 acquire enough energy between collisions to produce secondary ions and electrons which are also accelerated and produce more secondary electrons. Photons are also released during the production of secondary electrons. The photons in turn release photo electrons throughout the filling gas and from the walls of case 1 or from cathode 2.

The combined effect of the secondary electrons and the photons produce considerably more electrons than are available for the same primary ionization if the detector is operated in the plateau region as a conventional ionization chamber. The final number of electrons available per primary ionization electron is given by the following series:

$$M = x + x^2y + x^3y^2 + \ldots$$

where $M$ = final number of electrons per primary electron
$x$ = number of secondary electrons formed per primary electron
$y$ = probability that a photo electron is found per secondary electron The principle of gas amplification has been known for some time and has found application in the so-called proportional counter.

If the ratio of $V_2/a$ is increased still further, the detector will eventually be brought into the Geiger-Müller region. This region is characterized by the cessation of proportionality between the pulse amplitude or average current and the primary ionization. This is caused by the formation of a space charge around anode 3. The space charge is considerably reduced by the addition of grid 4 which is placed at a potential slightly positive with respect to cathode 2. The space charge of positive ions which prevented further increase of gas amplification without loss of proportionality between the primary ionization and the output current of the detector is attracted to the negative grid 4 and neutralized. The effective volume for collecting primary ionization continues to be the entire region encompassed by cathode 2, however. Thus, higher gas amplification limits as well as lower voltage $V_2$ requirements and proportionality of the detector response to primary ionization are realized through use of grid 4 in what would otherwise be the Geiger-Müller region.

The detector is particularly adaptable to the measurement of exposure rate. All that is required is the addition of a device to read the average current that flows from anode 3 due to the collection of electrons in the detector. The advantage in terms of simplicity of the device over systems utilizing impulse amplifiers and subsequent integrating networks is clearly seen. If maximum amplification is utilized in a detector having a volume of one liter or more, the available current is sufficient to directly operate a d'Arsonval meter movement for exposure rates above 2.5 mr./h. Below this level high-megohm resistor 12 in parallel with an electrometer 13 may be used to measure the current. However, since the useful gas amplification extends to $10^6$ and above, simple and inexpensive current measuring devices may be used to measure background exposure rates of only a few micro-roentgens per hour. The voltage drop measured across the input resistance of an ordinary vacuum tube voltmeter calibrated in exposure rate units is illustrative of the type of indicator which will suffice. The gas amplification and stability of indication are dependent on the filling gas. Quenching is important to suppress spurious current bursts. Good results are obtained with poly-atomic gases, such as methane. Diatomic gases, such as argon with a large percentage of propane or butane also work well. If the gas has no quenching action spurious impulses will contribute to the reading and the indication may be excessively erratic. Since average current must be measured, the time constant of the current indicating device should be long enough to smooth out the statistical reoccurrence rate of the primary ionizing events. Care must also be taken to avoid leakage current through or over the surface of the insulators from contributing to the current flowing to the current indicating device. This can be done through the use of protection rings or the use of the construction shown in FIGURE 1. Here, the protection ring action takes place due to the fact that case 1 itself acts as a conducting medium between the cathode insulators 5 and the anode insulators 7. Since case 1 is nearly at the potential of anode 3, very little current flows over insulators 7.

The indication is also dependent on the gas density. Therefore, unless the chamber is sealed or otherwise held at constant density, a correction must be applied to correct for changes in filling gas density due to changes in pressure or temperature. Correction factors are easily obtained by observing the change in indication obtained by varying the density in a constant field of radiation. The radiation source 14 and a suitable, remotely controlled shield can also be built into the device or even into the detector to allow direct calibration of the device to compensate for change in gas density. Since the device has a linear scale, calibration can be accomplished by simply changing the sensitivity of the current measuring device.

An accurate and dependable density meter can be constructed from the device shown in FIGURE 1 by including a radioactive source 14 in the detector and using sufficient thickness for the walls of case 1 to provide adequate personnel shielding from radiation. The electrometer 13 is then calibrated in units of gas density.

The air or gas monitor of FIGURE 2 allows for direct measurement of the exposure rate of airborne radioactive material. The improvement over systems recording the counts per unit of time are obvious to those skilled in the art. Since the exposure rate is equal to the dose rate to the lungs of personnel breathing the monitored air, the reading may be directly compared to safe limits expressed in rem. for exposure of an individual in the case of any combination of beta and gamma emitters. However, if alpha emitters are known or suspected to be present, the reading must be multiplied with the appropriate RBE. When contrasted with systems requiring the identification of type and relative quantity of isotopes so that the number of counts per minute can be related to the maximum allowable curiage of the material per unit of volume, it is seen that a system giving a direct reading in terms of dose rate to the lungs is indeed an improvement.

The system illustrated in FIGURE 2 functions as follows: The air or gas is drawn in at the intake 15 and passes over the dehydrator 16 which removes the water vapor. This is necessary since although the detector will function with air as a filling gas the amount of water vapor present as well as the density affect the indication. The dried air is then passed through a mixer 17, where it is combined with a small quantity of a suitable quenching agent such as alcohol vapor. The quenching agent further increases the stability of operation. The dried and treated air then passes through the detector 19 and from there is drawn through the vacuum pump 20. The air is then passed through a flow meter 21 and out the exhaust 22. The rate of flow is set by regulating the vacuum pump 20. The detector 19 is supplied with voltage from a high voltage source 23. The output current from detector 19 is measured by the average current indicator 24 which may be calibrated directly in suitable units of exposure rate. The average current indicator 24 may also be equipped with a sensitivity control to allow setting in the RBE multiplier and/or to allow calibration of the detector. Calibration to compensate for changes in air density can either be done by use of a chart and knowledge of the temperature and atmospheric pressure or it may be done directly by means of a radioactive source having fixed geometry with respect to the detector, as described above.

As a further refinement, a second detector 25 with the same sensitivity as detector 19 but filled with non-radioactive gas, and high voltage source 26 may be so connected as to cause current to flow in a direction such as to cancel current flowing from detector 19. The net effect is to subtract the effect of external radiation on the indication. A still further refinement may be made to provide an adjustment to compensate for contamination of detector 19 by radioactive dust. The system should read zero during purging by tanked non-radioactive air. If not, it can be brought to zero with variable current bias source 27.

All components shown in FIGURE 2 are of conventional design when taken separately, except the detector 19 which is described above.

What is claimed is:

1. A radiation detector comprising a conductive housing, an anode element, a cathode element, and a grid element means located between said anode element and cathode element for reducing space charge around said anode element, separate insulator means for mounting each of said elements within said housing, means connecting said housing with electrical ground, and means for biasing said cathode element and grid element means negative with respect to said anode element and said housing.

2. A radiation detector as defined in claim 1 and further including means for detecting the mean current flow to the anode element when said elements are exposed to radiation.

3. A radiation detector as defined in claim 1 and further including a vacuum pump connected to the interior of said housing to exhaust air therefrom.

4. A radiation detector as defined in claim 1 wherein said anode element, said cathode element, and said grid element means are concentrically disposed.

5. An ionizing radiation dose rate measuring system comprising:
   (a) a radiation detector comprising a conductive housing, an anode element, a cathode element, and a grid element means for reducing space charge around said anode element within said housing;
   (b) means connecting said housing with electrical ground;

(c) means for biasing said cathode element and grid element means negative with respect to said anode element and said housing;
(d) means for detecting the mean current flow from said anode element when said elements are exposed to radiation;
(e) means for exhausting air from within said housing including a vacuum pump and flow meter for indicating the rate of flow through said vacuum pump; and,
(f) means for introducing air within said housing.

6. The system defined in claim 5 wherein said means for introducing air comprises means for dehydrating air, and means for mixing the dehydrated air with a quenching agent prior to introduction of said air within said housing.

7. The system defined in claim 5 and further including reference detector means coupled in circuit with said first mentioned detector means to nullify the means anode current flow from said first mentioned detector means when the same is at a reference level.

References Cited
UNITED STATES PATENTS

| | | | |
|---|---|---|---|
| 2,480,808 | 8/1949 | Fearon | 250—83.6 X |
| 2,485,516 | 10/1949 | Thompson | 250—83.6 |
| 2,954,474 | 9/1960 | Lawrance | 250—83.6 |
| 3,046,396 | 7/1962 | Lovelock | 250—43.5 |
| 3,087,113 | 4/1963 | Foster | 250—83.6 X |
| 3,287,560 | 11/1966 | Morgan | 250—83.6 |

ARCHIE R. BORCHELT, *Primary Examiner.*
RALPH G. NILSON, *Examiner.*